No. 727,708. PATENTED MAY 12, 1903.
W. E. STOCKTON.
BICYCLE ATTACHMENT.
APPLICATION FILED MAR. 31, 1902.
NO MODEL.
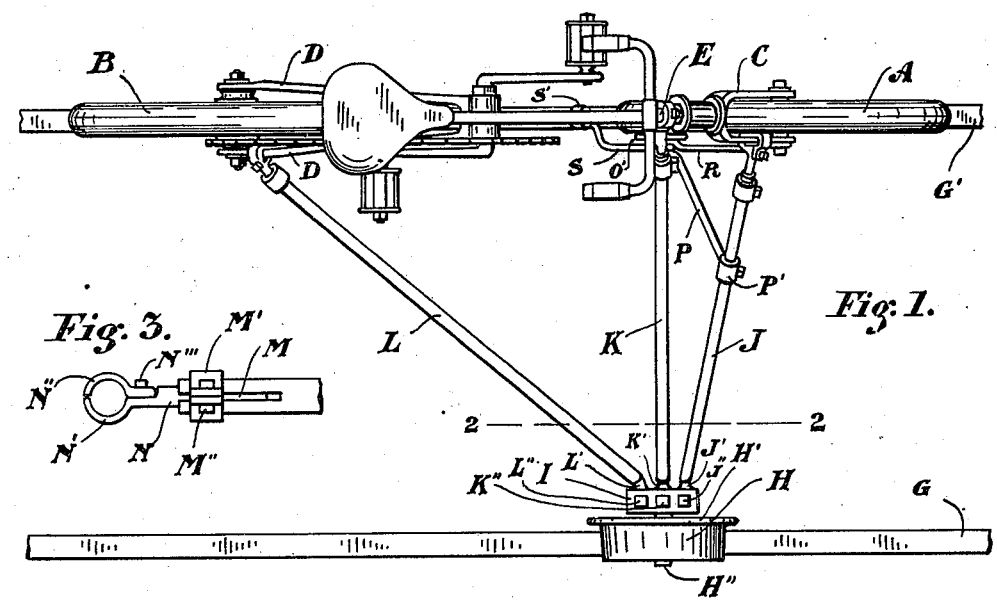
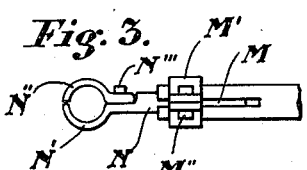
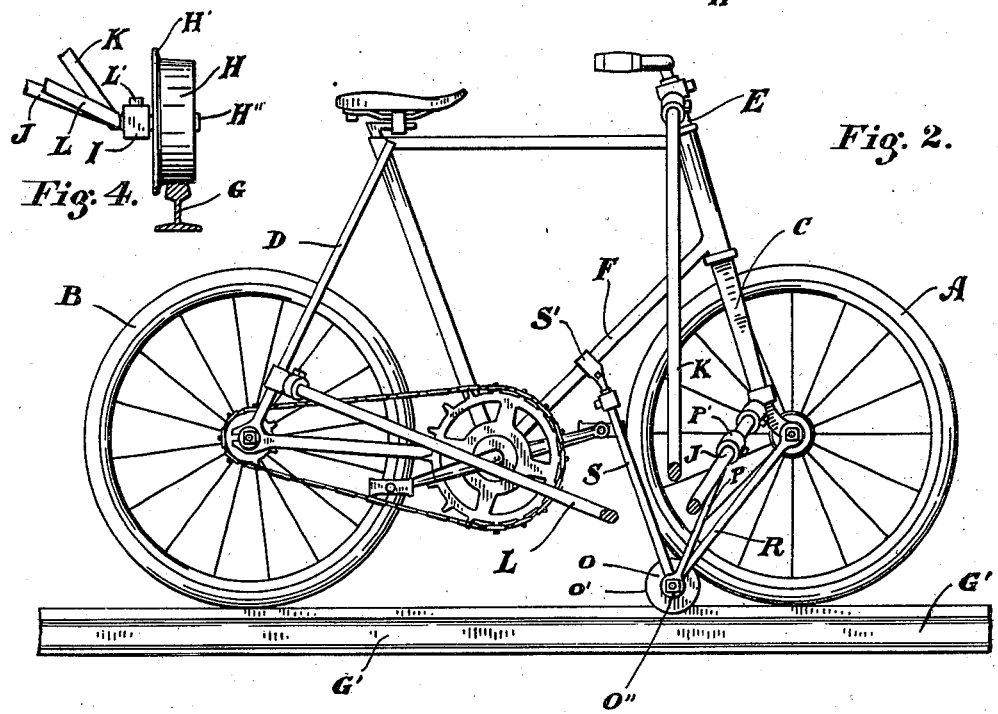

No. 727,708. Patented May 12, 1903.

UNITED STATES PATENT OFFICE.

WILLIAM E. STOCKTON, OF ALEXANDRIA, INDIANA.

BICYCLE ATTACHMENT.

SPECIFICATION forming part of Letters Patent No. 727,708, dated May 12, 1903.

Application filed March 31, 1902. Serial No. 100,653. (No model.)

*To all whom it may concern:*

Be it known that I, WILLIAM E. STOCKTON, a citizen of the United States, residing at Alexandria, county of Madison, and State of Indiana, have invented a new and useful Bicycle Attachment, of which the following is a specification.

This invention relates to an attachment to be applied to an ordinary bicycle, so that the same can be ridden on a railroad.

The aim and purpose of the invention is to provide an attachment which can be easily attached to or detached from the bicycle and an attachment which will not interfere with switches, crossings, or frogs and at the same time positively keep the bicycle on the track at all times. These and other objects not hereinbefore mentioned are accomplished by the construction illustrated in the accompanying drawings, wherein like letters of reference indicate corresponding parts in the several views, and in which—

Figure 1 is a top plan view of a bicycle with my attachment secured to the same, the whole resting on a railroad. Fig. 2 is a side elevation of a bicycle, showing a portion of my attachment in place and the rods in section. Figs. 3 and 4 are enlarged detail views.

In the drawings, A designates the front wheel of an ordinary bicycle, and B the rear wheel. C designates the front fork, and D the rear fork. E designates the steering-rod, and F designates the lower inclined reach. G G' designate the rails. All of the parts thus described are of the usual construction.

The wheels of the bicycle are intended to ride on one of the rails, and a guide-wheel H rides on the opposite rail. This guide-wheel is provided with a flange H' on one side only, which bears against only the inner side of the rail G.

H" designates the axle of this wheel, and the wheel is preferably mounted on ball-bearings on the same. On the inner end of this axle is rigidly secured a head-block I.

J, K, and L designate rods extending from the bicycle to this block I. The ends of the rods adjacent the block are reduced, as shown at J', K', and L', respectively, and pass into apertures in the block and are secured in place by means of set-bolts J", K", and L", respectively. These rods are preferably tubular, and the reduced ends are inserted therein and then welded in place. The rod J extends slightly forward and terminates adjacent the lower end of the front fork C. The rod K extends in a substantially transverse upwardly direction in relation to the tracks and terminates at a point adjacent the steering-rod E. The rod L extends in a rearwardly direction and terminates adjacent the rear fork D. The rods are secured to the front fork, steering-rod, and rear fork, respectively, in a similar manner, so a description of one of these securing means will suffice for all. The ends of the rods are split, as shown at M, and are provided with clamps M'. Within this split portion is inserted a smaller rod N. The split portion is then tightened by means of the bolts M", passing through the ears M'" on the clamp M'. On the end of this reduced portion and formed integral therewith is one-half of a clip N'. This clip extends partly around either one of the forks or steering-head and is secured thereto by means of the other half of the clip N". The two halves are secured together by means of a bolt N'".

O designates a guide-roller. This roller is provided with a flange O' on one side only, which is adapted to bear against the inner side of the rail G'. O' designates the axle of this roller. The roller is preferably mounted on the axle by means of ball-bearings. Secured to the inner end of this axle are three braces P, R, and S. The brace S extends upwardly and is secured to the lower inclined reach F by means of a clip S'. The brace R extends forwardly and is secured to the axle of the front wheel by means of the ordinary securing-nut. The brace P extends forwardly and at an angle to the line of the rails and is secured to the rod J by means of the clip P'. The roller O is positioned so that it will bear no weight of the rider and is always supported slightly above the rail, but in such a position that the flange O' will at all times bear against the inner side of the rail. By this construction I can reduce the size of the roller and also its braces, thereby reducing the weight of these parts very materially.

By referring to Fig. 1 it will be noticed that the guide-wheel H is substantially directly opposite from the guide-roller O and that the guide-roller is directly connected with the rod J, so that any lateral strain on either the guide-wheel or guide-roller will be instantly communicated to the other. This is a very important feature of my invention, especially when the machine is going around a curve, where either one side or the other will be raised. If, for instance, the guide-wheel was raised, it would have a tendency to force the whole machine to the left. Inasmuch as this pressure would be immediately applied in a straight lateral direction to the guide-roller by means of the rod J and brace P it would firmly force the guide-roller against the inner side of its rail, thereby preventing the machine from leaving the track.

As before described, the rod K extends in an upwardly direction and substantially in a transverse direction in relation to the line of track and is secured to the steering-rod. By this construction the upper part of the bicycle is firmly braced and securely fastened to the guide-wheel, and at the same time, as this rod is secured to the steering-rod, it will take a considerable amount of strain off of the rod J in aiding to prevent the front wheel from being guided by the steering-rod. It will also be noticed that the connection between the rod K and steering-rod is directly above the guide-roller, so that when the machine is going around a curve there will be the same lateral strain between the guide-wheel and upper portion of the bicycle as there is between the guide-wheel and guide-roller, so that these parts as arranged will make a truss.

By placing the guide-roller between the wheels of the bicycle I need use but one guide-roller, thereby dispensing with any rollers in the front of the front wheel or in the rear of the rear wheel. In this construction I can also position the guide-roller far enough in front of the rear wheel so that it can be opposite the guide-wheel and at the same time place the guide-wheel in its proper position in front of the seat of power, so that it will not bind the machine on the track.

By supporting the guide-roller only by the lower portion of the machine I can position the braces out of the way of the rider and at the same time make them shorter and lighter and of ample rigidity.

By using a guide-wheel and a guide-roller which only have flanges on their inner sides to bear against the inner sides of the rail I provide an attachment which will not interfere with plankings at crossing or frogs or switches.

Having thus described my invention, what I claim as new, and desire to secure by Letters Patent, is—

1. An attachment for bicycles consisting of a guide-wheel adapted to ride over one rail of a railroad, a flange on the inner side of the wheel adapted to bear against the inner side of this rail, three connecting-rods extending from the guide-wheel, one rod extending rearwardly and connected to the rear fork of a bicycle, one rod extending transversely and upwardly and connected to the steering-rod of the bicycle, and the other rod extending forwardly and connected to the front fork of the bicycle, a guide-roller positioned between the wheels of the bicycle and substantially opposite the guide-wheel and over the other rail, the roller being provided with a flange on one side adapted to bear against the inner side of this rail and supported by three braces, one brace being connected to the reach of the bicycle, one brace being connected to the front fork of the bicycle and the other brace being connected to the rod connecting the guide-wheel and front fork.

2. An attachment for bicycles consisting of a guide-wheel adapted to ride over one rail of a railroad, a flange on the inner side of the wheel adapted to bear against the inner side of this rail, three connecting-rods extending from the guide-wheel, one rod extending rearwardly and connected to the rear fork of a bicycle, one rod extending transversely and connected to the upper part of a bicycle, and the other rod extending forwardly and connected to the front fork of the bicycle, a guide-roller supported by the bicycle positioned between the wheels of the bicycle and beneath the connection between the rod which connects with the upper part of the bicycle, the said roller being positioned over the other rail and substantially opposite the guide-wheel, a flange on the inner side of the guide-roller adapted to bear against the inner side of this rail, and a brace connecting the guide-roller to the rod connecting the guide-wheel with the front fork.

In testimony whereof I have hereunto affixed my signature in the presence of two witnesses.

WILLIAM E. STOCKTON.

Witnesses:
CALEB C. PARRY,
WM. DU VAL BROWN.